(12) United States Patent
Takahashi et al.

(10) Patent No.: US 7,793,748 B2
(45) Date of Patent: Sep. 14, 2010

(54) VEHICLE COWL WITH OPENING FOR HORN

(75) Inventors: Kuniyuki Takahashi, Shizuoka (JP); Katsumitsu Wakamatsu, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 119 days.

(21) Appl. No.: 12/344,385

(22) Filed: Dec. 26, 2008

(65) Prior Publication Data

US 2009/0178870 A1 Jul. 16, 2009

(30) Foreign Application Priority Data

Dec. 27, 2007 (JP) ............................. 2007-336646
Nov. 17, 2008 (JP) ............................. 2008-293201

(51) Int. Cl.
*B62K 11/00* (2006.01)
(52) U.S. Cl. ................... 180/219; 280/288.4; 180/68.1
(58) Field of Classification Search ................ 180/219, 180/288.4, 68.1; 296/78.1
See application file for complete search history.

(56) References Cited

U.S. PATENT DOCUMENTS

| | | | |
|---|---|---|---|
| D294,922 S * | 3/1988 | Nagy | D12/126 |
| 5,613,569 A * | 3/1997 | Sugioka et al. | 180/68.5 |
| 6,102,149 A * | 8/2000 | Suzuki et al. | 180/229 |
| 7,243,750 B2* | 7/2007 | Nakabayashi et al. | 180/68.1 |
| 7,503,415 B2* | 3/2009 | Hasegawa et al. | 180/228 |
| 2006/0087144 A1* | 4/2006 | Kamimura et al. | 296/78.1 |
| 2007/0240924 A1* | 10/2007 | Kurihara | 180/219 |
| 2008/0156562 A1* | 7/2008 | Yano et al. | 180/219 |
| 2008/0223643 A1* | 9/2008 | Arimura | 180/229 |
| 2009/0166120 A1* | 7/2009 | Okamoto | 180/229 |
| 2010/0025140 A1* | 2/2010 | Takenaka et al. | 180/219 |
| 2010/0101482 A1* | 4/2010 | Nishimoto et al. | 116/28 R |

FOREIGN PATENT DOCUMENTS

| | | |
|---|---|---|
| EP | 0 755 819 A1 | 1/1997 |
| EP | 1 905 678 A1 | 4/2008 |
| JP | 63-13392 | 11/1988 |
| JP | 2004-216938 | 8/2004 |

* cited by examiner

*Primary Examiner*—Lesley Morris
*Assistant Examiner*—Tashiana Adams
(74) *Attorney, Agent, or Firm*—Rabin & Berdo, PC (57) ABSTRACT

A vehicle can include a horn able to produce an effective sound volume. The vehicle can be a motorcycle. The horn of the motorcycle can be positioned relative to parts of the motorcycle in such a way that an effective sound volume can be produced by the horn, while obstruction by the horn of cooling airflow is reduced or eliminated. In particular, at least a part of the horn can be displaced laterally from front forks of the motorcycle, in a position where the horn overlaps with an inner panel of a cowl of the motorcycle in a front view.

20 Claims, 12 Drawing Sheets

VEHICLE COWL WITH OPENING FOR HORN

TECHNICAL FIELD

Embodiments of the present invention relate generally to a vehicle, such as a motorcycle, including a horn. More specifically, the embodiments relate to a vehicle cowl with an opening for a horn, and a position of the horn relative to the cowl and other portions of the vehicle.

BACKGROUND ART

A horn of a vehicle, such as a motorcycle, needs to deliver a sound at a predetermined or higher volume to a person or the like in front of the vehicle, in order for the sound to be effective. The position of the horn on the vehicle is a factor in how effectively the horn can deliver sound.

For example, a position of the horn relative to a vehicle cowl can influence the sound that the horn produces. A motorcycle, for example, can include a full cowl, which may cover substantially the whole front portion of the motorcycle body. Among motorcycles having full cowls, such as disclosed by JP 63-13392, there are motorcycles having a front cowl for covering front portions of handlebars, an inner panel disposed to extend between positions above and behind a front wheel, and side covers disposed laterally outside the inner panel and extending rearward. The inner panel may have an opening therein to allow for sounding of the horn, and to let cooling air flow through to engine parts needing cooling.

SUMMARY OF THE INVENTION

Embodiments of the invention relate to a vehicle having a horn that can produce an effective sound volume. The vehicle can be a motorcycle. The horn of the motorcycle can be positioned relative to parts of the motorcycle in such a way that an effective sound volume can be produced by the horn, while obstruction by the horn of cooling airflow is reduced or eliminated. In particular, at least a part of the horn can be displaced laterally from front forks of the motorcycle, in a position where the horn overlaps with an inner panel of a cowl of the motorcycle in a front view.

DETAILED DESCRIPTION OF THE INVENTION

Embodiments of the invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

First Exemplary Embodiment

Figure 1:
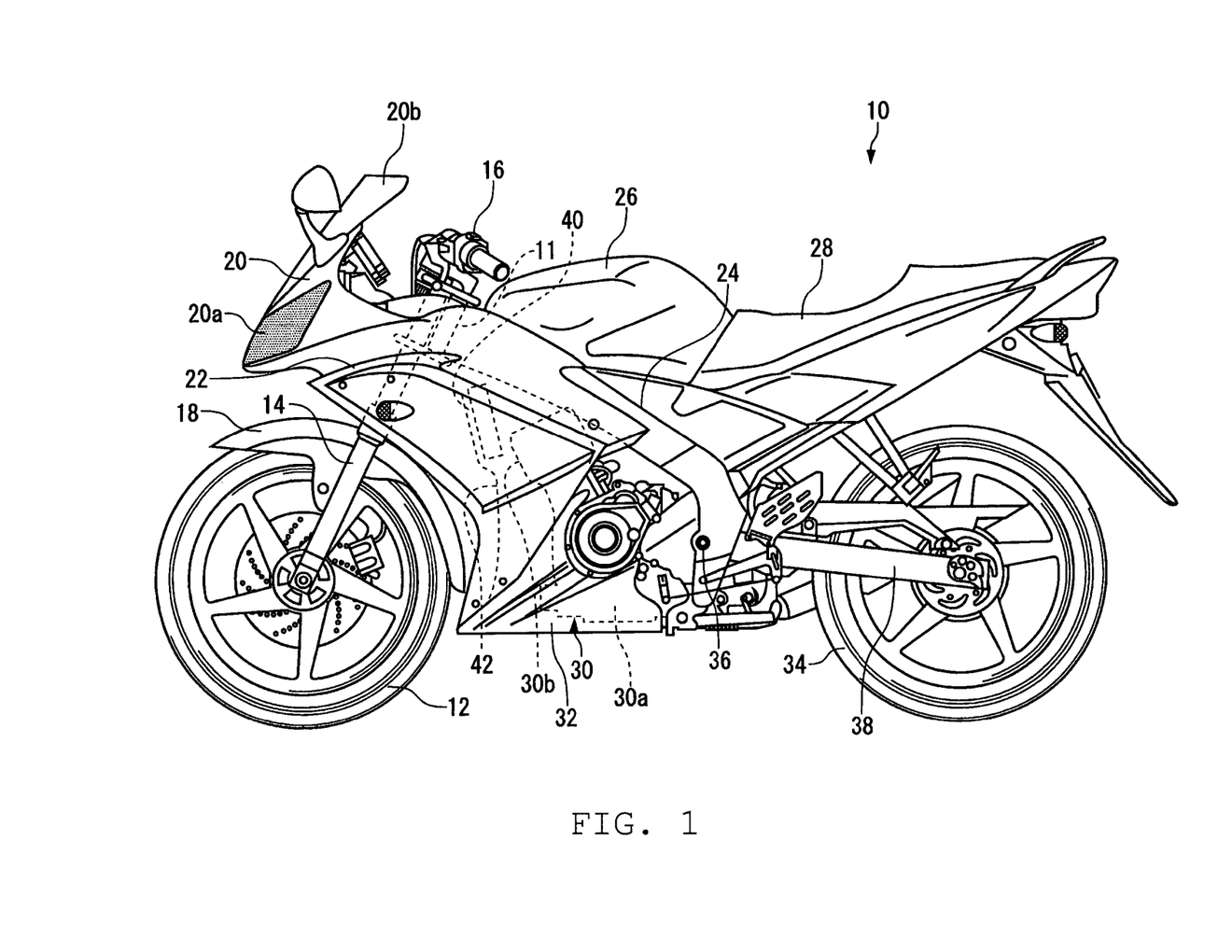
FIG. 1 is a side view of an example of a vehicle, specifically, a motorcycle, according to embodiments of the invention.

As shown in FIG. 1, a vehicle 10, for example, a motorcycle, according to a first exemplary embodiment of the invention can include a vehicle frame 24 having head pipes 11. On the vehicle frame 24, a fuel tank 26 and a seat 28 can be supported. Rear arms 38 can be pivotably supported by the vehicle frame 24 with a pivot shaft 36 interposed therebetween. On rear end portions of the rear arms 38, a rear wheel 34 can be rotatably supported.

Figure 2:
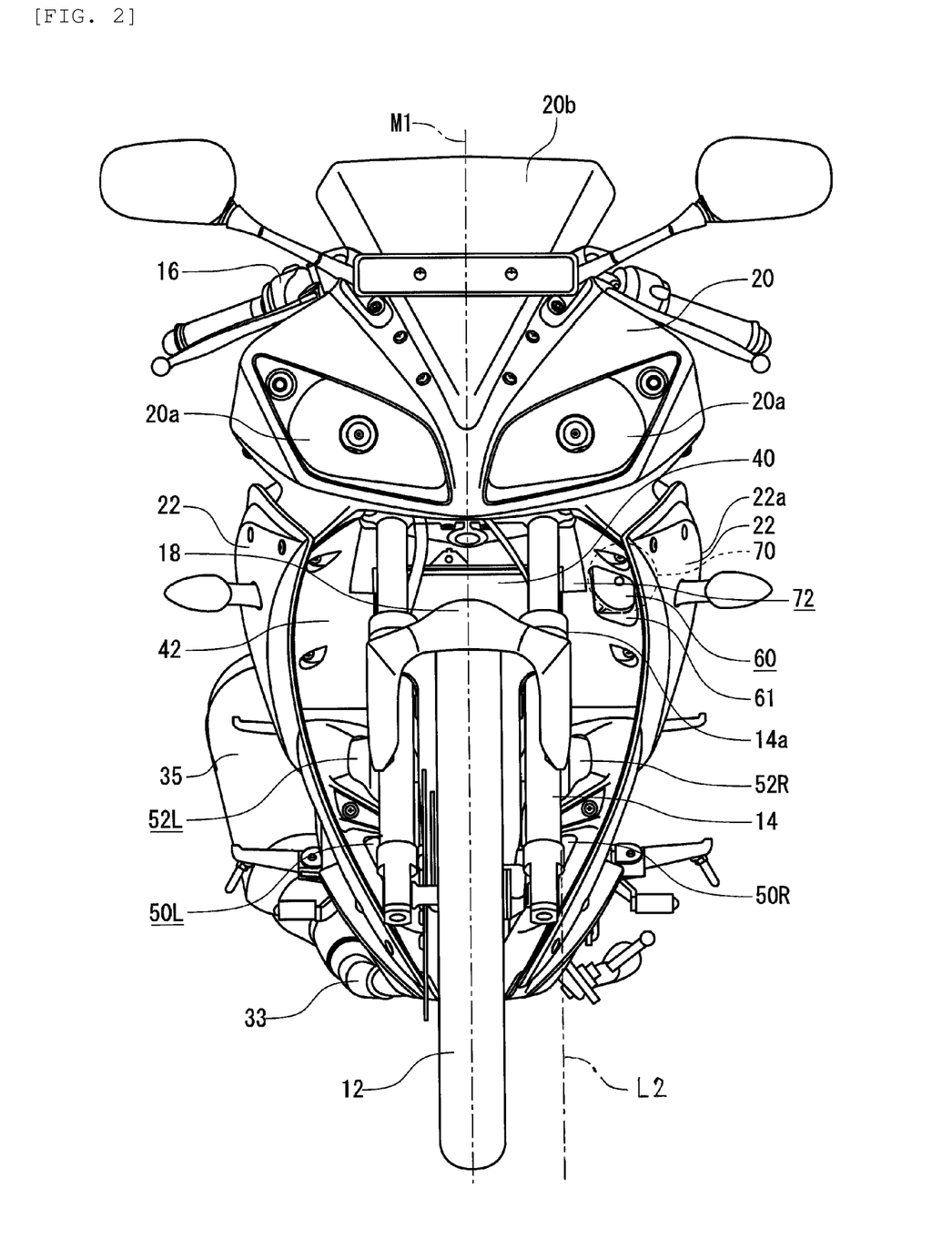
FIG. 2 is a front view of the motorcycle.
Figure 7:
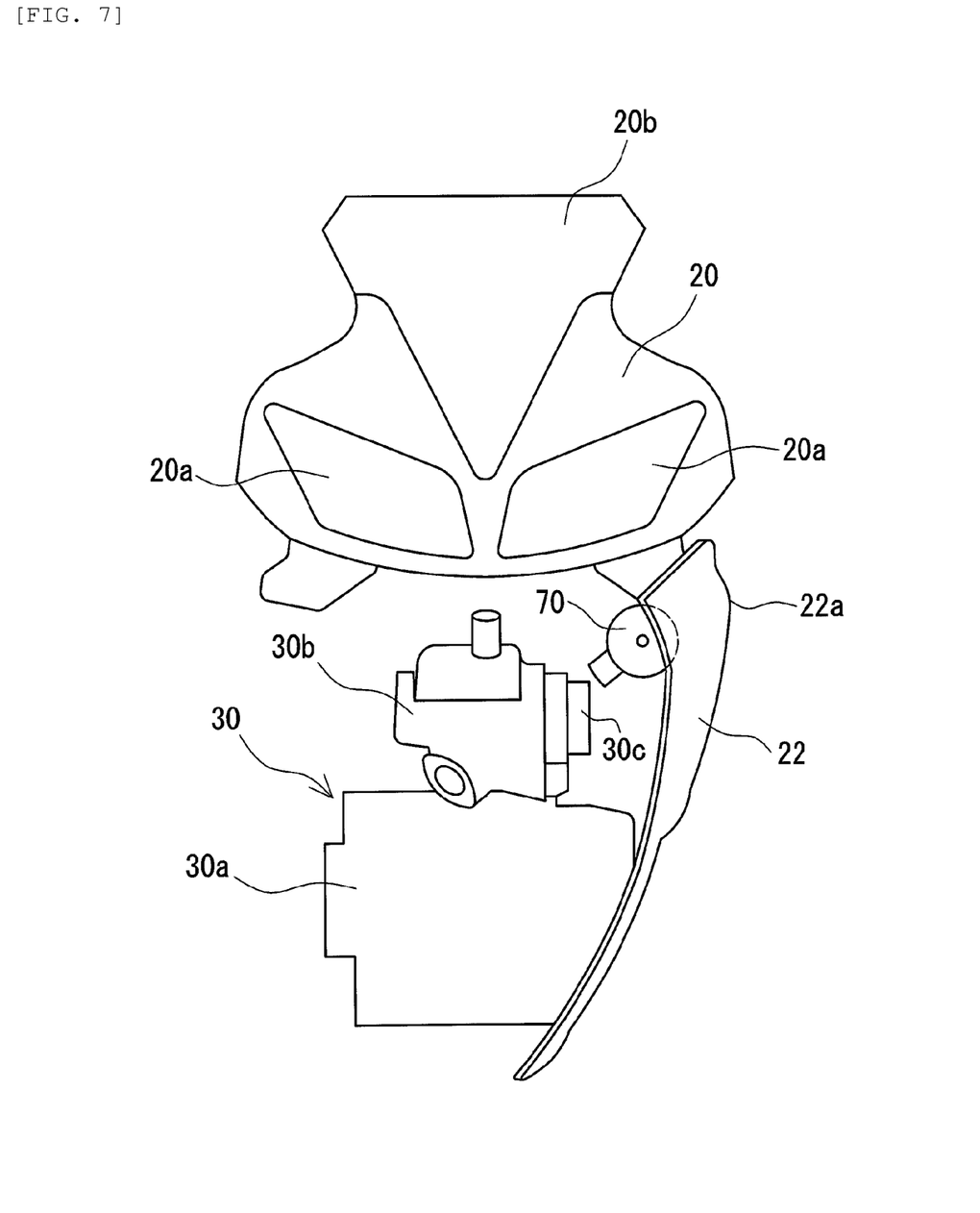
FIG. 7 is a front view showing a positional relationship between an engine and the horn.

From the vehicle frame 24, an engine 30 can be suspended. In the illustrated embodiment, the engine 30 is a water-cooled single-cylinder engine. However, other kinds of engines can be used. For example, the engine 30 may be an air-cooled engine, or may be a multi-cylinder engine. The engine 30 can have an engine body 30a and a cylinder 30b extending diagonally forward and upward from the engine body 30a. On a right side of the cylinder 30b when viewed from the front, a water pump 30c can be mounted as shown in FIG. 7. As shown in FIG. 2, on a left side of the vehicle viewed from the front, an exhaust pipe 33 can be disposed. The exhaust pipe 33 can be connected to the cylinder 30b. A muffler 35 can be mounted on a rear end portion of the exhaust pipe 33.

As shown in FIG. 1, front forks 14 can be supported, for turning by the head pipes 11. A handlebar 16 can be mounted on upper portions of the front forks 14. At lower portions of the front forks 14, a front wheel 12 can be rotatably supported. The front forks 14 can also be mounted with a fender 18 for covering upper end rear portions of the front wheel 12.

In front of the head pipes 11, a front cowl 20 can be provided. The front cowl 20 can be provided with a headlight 20a and a wind shielding plate 20b. Under the front cowl 20, an inner panel 42 extending between positions above and behind the front wheel 12 can be disposed. In this illustrative embodiment, the fender 18 can be provided above and behind the front wheel 12. Therefore, the inner panel 42 can be disposed to extend between positions above and behind the fender 18. Laterally outside the inner panel 42, left and right side covers 22 extending rearward can be provided, respectively.

It should be understood that "laterally" or "lateral" or "lateral direction" as used herein refers to a vehicle side-to-side or transverse direction with respect to a vehicle front-to-rear or rear-to-front direction. Thus, for example, referring to FIG. 2., which is a front view of the motorcycle 10, "lateral direction" may refer to a direction substantially perpendicular to a central line M1 bisecting the motorcycle 10. It should further be understood that left and right, in the lateral direction, for a viewer viewing the motorcycle 10 from the front (as in FIG. 2), would be reversed for a rider seated on the seat 28 and facing forward.

FIG. 2 further shows a virtual line L2. The virtual line L2 is a line showing a right end position of the front forks 14 in the lateral direction. In the first embodiment, a whole horn opening 60 can be positioned to the right of the virtual line L2, which means that the whole horn opening 60 is completely positioned outside of, or completely separated or displaced laterally from, the front forks 14 in a front view such as FIG. 2. In a second exemplary embodiment described in more detail further below, on the other hand, an airflow opening 52R can function as the horn opening and can be partially positioned to the left of the virtual line L2, and partially positioned to the right of the virtual line L2. In this case, only part of the horn opening is positioned outside of or laterally separated or displaced from the front forks 14 if the airflow opening 52R functions as the horn opening. Thus, the phrase, "at least partially positioned outside, or at least partially separated or displaced from, the front forks in the lateral direction" is descriptive of both the positional relationship between the horn opening 60 and the front forks 14 as shown in FIG. 2, and a positional relationship between the front forks 14 and the airflow opening 52R.

Figure 3:
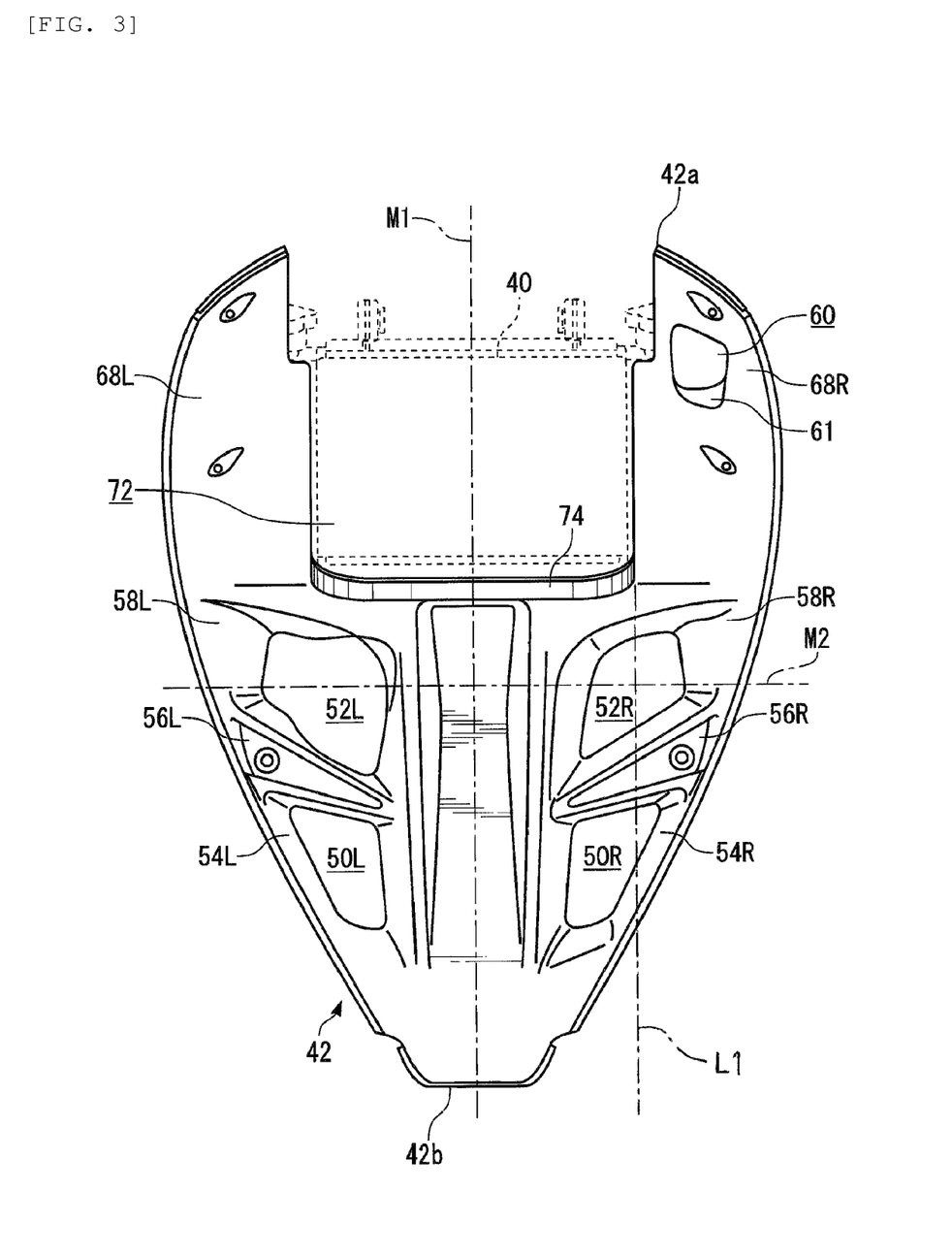
FIG. 3 is a front view of an inner panel according to embodiments of the invention.

FIG. 3 is a front view of the inner panel 42. As shown in FIG. 3, the inner panel 42 can be formed with a main opening 72 extending laterally across the center (e.g., across the central line M1) of the vehicle. As used herein, "openings in the inner panel" may refer to holes or openings formed entirely within a periphery of the inner panel 42, such as openings 52L, 52R, 50L and 50R discussed in more detail further on, or to a recess or "cut-out" formed at a periphery of the inner panel 42, such as main opening 72. The main opening 72 can include a recessed portion formed at an upper portion of the inner panel 42, as seen in FIG. 3. In the orientation shown in FIG. 3, the main opening 72 can be considered to extend in a downward direction relative to an upper periphery of the inner panel 42, and can be formed above a middle position (e.g. a central line M2 that is substantially transverse to line M1) in a vertical direction with respect to the inner panel 42. The main opening 72 can be adjacent to the horn opening 60 and laterally displaced or separated from the horn opening 60 in a front view. Further, the main opening 72 can be laterally displaced inward from a horn 70 in the front view. The horn opening 60 can be formed in a position of the inner panel 42 in front of the horn 70. The main opening 72 can allow rearward passage of air flowing from the front of the motorcycle 10, to thereby supply the flowing air to a radiator 40.

FIG. 3 further shows a virtual line L1. The virtual line L1 is a line showing a right end position of the main opening 72 in the lateral direction. In the first embodiment, the whole horn opening 60 can be positioned to the right of the virtual line L1, which means that the whole horn opening 60 can be completely positioned on the outside of, or completely separated or displaced laterally from, the main opening 72 in a front view such as FIG. 3. In the second embodiment described below, on the other hand, the airflow opening 52R can function as the horn opening and can be partially positioned to the left of the virtual line L1, and partially to the right of the virtual line L1. In this case, only part of the horn opening is positioned outside of or laterally separated or displaced from the main opening 72 if the airflow opening 52R functions as the horn opening. Thus, the phrase, "at least partially positioned outside, or at least partially separated or displaced from, the main opening in the lateral direction" is descriptive of both the positional relationship between the main opening 72 and the horn opening 60 as shown in FIG. 3, and a positional relationship between the main opening 72 and the airflow opening 52R.

Under the main opening 72, airflow openings 52L, 52R and airflow openings 50L, 50R can be formed in the inner panel 42. The airflow opening 52L and the airflow opening 52R can be formed in bilaterally symmetric positions with respect line M1. Likewise, the airflow opening 50L and the airflow opening 50R can be formed in bilaterally symmetric positions with respect to line M1. The airflow openings 52L, 52R can be formed above the airflow openings 50L, 50R. The airflow openings 50L, 50R, 52L, 52R can supply flowing air to parts (e.g., the engine 30) disposed behind the inner panel 42 and in need of cooling.

Around the airflow openings 50L, 50R, 52L, 52R, respective air leading faces 54L, 54R, 58L, 58R spreading toward the front of the vehicle can be formed. The air leading faces 54L, 54R, 58L, and 58R can form duct shapes tapered rearward from the front of the vehicle to thereby effectively send flowing air to the back of the inner panel 42. Between the airflow opening 52L and the airflow opening 50L, a reinforcement rib 56L can be formed. Between the airflow opening 52R and the airflow opening 50R, a reinforcement rib 56R can be formed. Under the main opening 72, a reinforcement rib 74 extending in the lateral direction can be formed.

On left and right opposite sides, respectively, of the main opening 72 of the inner panel 42, air leading walls 68L, 68R rising to front ends of the side covers 22 can be formed. The right air leading wall 68R can be formed with a horn opening 60. The horn opening 60 can be formed adjacently to and/or laterally separated or displaced from, e.g., formed to one side of, the main opening 72. The horn opening 60 can be formed above the middle position in a vertical direction with respect to the inner panel 42 (e.g., above line M2) in the orientation shown in FIG. 3. In this embodiment, the horn opening 60 can be formed between an upper end 42a of the inner panel 42 and a position substantially or approximately one-quarter of a vertical length of the inner panel 42 from the upper end 42a to a lower end 42b. However, a position of the horn opening 60 can be changed in various ways and is not limited to the above position.

Figure 4:
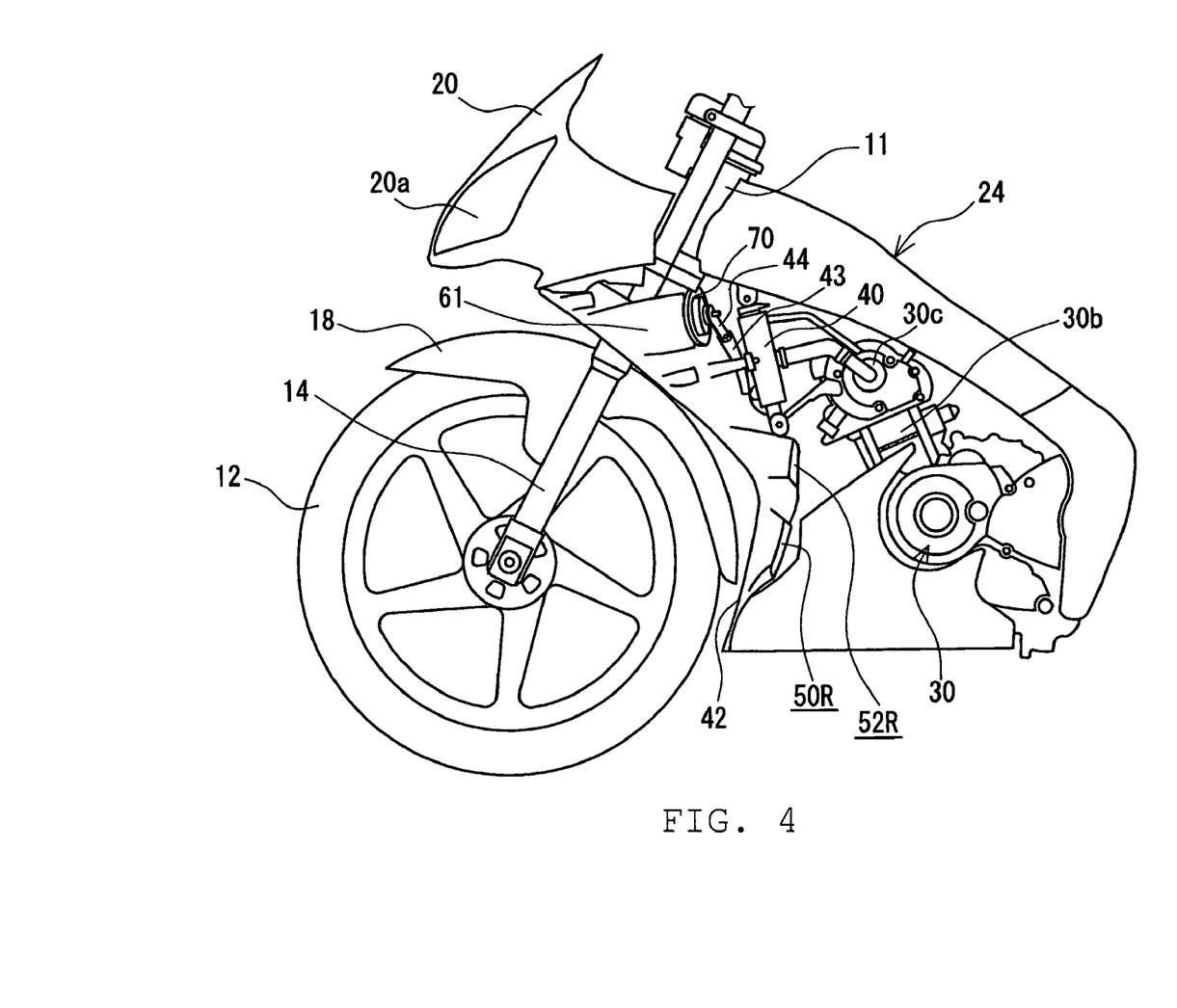
FIG. 4 is a cut-away side view showing an inside of the motorcycle according to a first exemplary embodiment.
Figure 5:
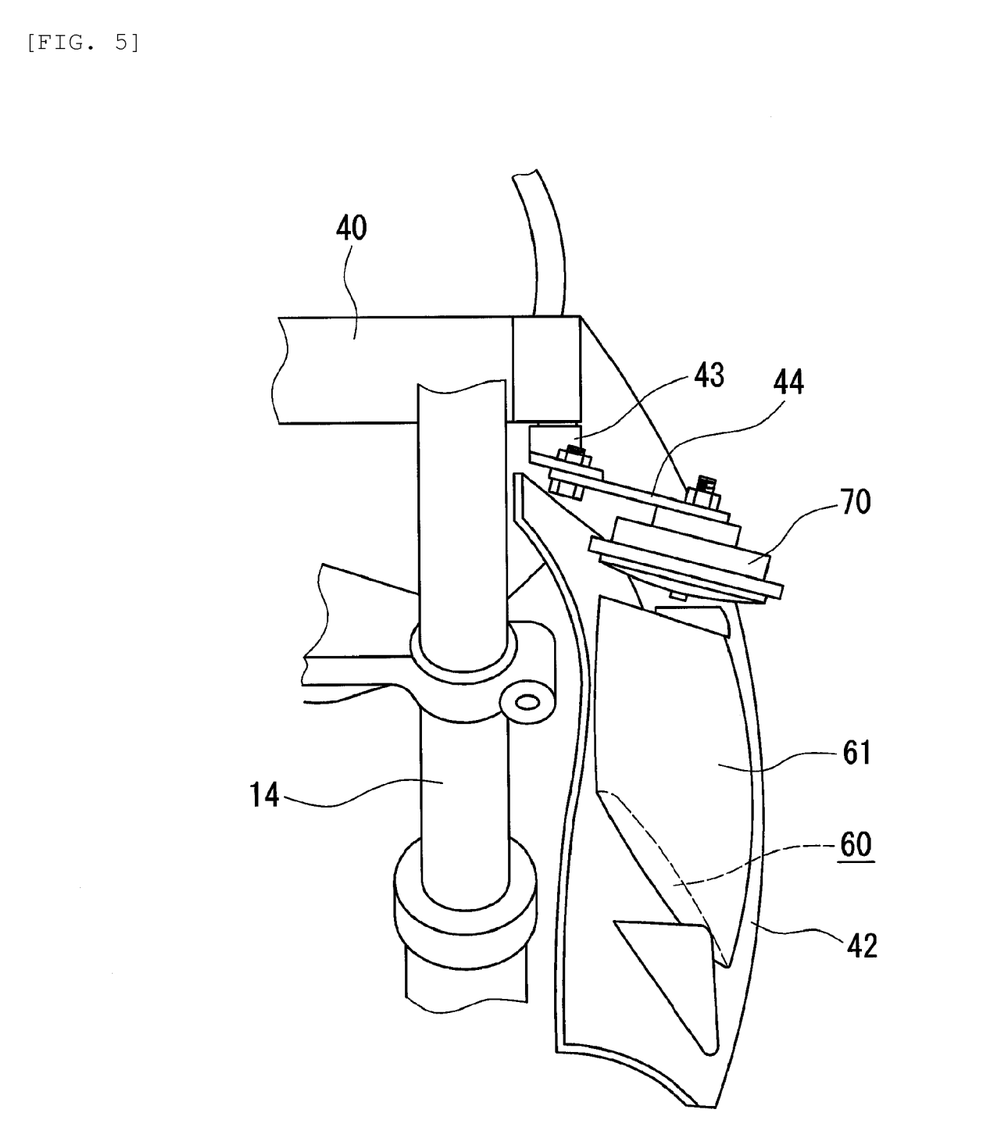
FIG. 5 is a partial plan view of a horn and the inner panel according to embodiments of the invention.

Although a size of the horn opening 60 is not limited to any particular size, the horn opening 60 can be smaller than the main opening 72 in the embodiment under discussion. The horn opening 60 can, for example, be larger or smaller than, or about the same size as any one of the airflow openings 50L, 50R, 52L, 52R. A shape of the horn opening 60 is not limited to any particular shape, and can be, for example, a rectangle, a circle, an ellipse, or another shape. As shown in FIGS. 4 and 5, a cylindrical portion 61 extending rearward can be arranged about the horn opening 60. For example, the cylindrical portion 61 can be provided on a rear side of the horn opening 60 on the inner panel 42. In the embodiment under discussion, the cylindrical portion 61 can be part of the inner panel 42 and be integral with the inner panel 42. However, the cylindrical portion 61 may be formed separately from the inner panel 42 and mounted on or adjacent to the inner panel 42 as a separate act. In the embodiment under discussion, the cylindrical portion 61 can be formed, for example, in a shape of a prismatic cylinder. However, the shape of the cylindrical portion 61 is not limited to any particular shape and may be a circular cylinder, an elliptic cylinder, a triangular cylinder, or other shapes. The cylindrical portion 61 can extend substantially horizontally in a side view but may be slightly inclined forward or rearward. In the illustrative example shown in FIG. 4, the cylindrical portion 61 extends substantially horizontally with a slight upward inclination toward a rear end thereof.

As shown in FIGS. 2 and 4, the radiator 40 can be disposed behind the main opening 72 in the inner panel 42. The flowing air passing through the main opening 72 can be supplied to the radiator 40.

As shown in FIGS. 4 and 5, a bracket 43 can be supported on a right portion of the radiator 40. The bracket 43 can be mounted with a stay 44 for supporting the horn 70. In this way, the horn 70 can be supported by the radiator 40 with the stay 44 and the bracket 43 interposed therebetween. The horn 70 can be disposed behind the cylindrical portion 61 of the inner panel 42. Therefore, the horn 70 can be disposed in a position spaced rearward from the horn opening 60 in the inner panel 42. Moreover, the horn 70 can be disposed to face substantially forward through the horn opening 60 so as to emit a warning sound forward through the horn opening 60. In other words, the horn 70 can be disposed to face substantially forward.

As used herein, the phrase "disposed to face substantially forward" includes a range of positions. For example, the phrase describes a position that is substantially parallel to a plane orthogonal to a front-to-rear direction of the vehicle 10 body, but also describes a position that is inclined with respect to such a plane. For example, the horn 70 can be inclined to such a degree that a left or right end and an upper or lower end of the horn 70 can be seen from the front. If inclined to such a degree, the horn 70 is regarded as being disposed to face substantially forward. As a further example, if an angle of inclination of the horn 70 with respect to a plane orthogonal to a front-to-rear direction of the vehicle 10 body is 30° or smaller, the horn 70 is also regarded as being disposed to face substantially forward. The horn 70 can be oriented so that a front surface thereof is substantially orthogonal to a longitudinal direction of the cylindrical portion 61.

Next, positions of the horn opening 60 and the horn 70 when viewed from the front will be described. As shown in FIG. 2, the horn opening 60 and the horn 70 can be disposed to the right of the main opening 72. However, part of the horn 70 may be positioned inside the main opening 72. The horn opening 60 and the horn 70 can be disposed to the right of the radiator 40. Specifically, the horn opening 60 and the horn 70 can be disposed to as to be laterally separated or displaced from the radiator 40, between a right end of the radiator 40 and an outmost end 22a of the right side cover 22.

Moreover, the horn opening 60 and the horn 70 can be disposed to the right of the front forks 14. Specifically, the horn opening 60 can be disposed between a right end 14a of the front forks 14 and the outmost end 22a of the right side cover 22. A lateral width of the horn 70 can be shorter than a distance between the right end 14a of the front forks 14 and the outmost end 22a of the right side cover 22, and the horn 70 can be disposed between the right end 14a of the front forks 14 and the outmost end 22a of the right side cover 22. Although, in the embodiment under discussion, the whole horn 70 can be disposed to the right of the right end 14a of the front fork 14, it is also possible that only a part of the horn 70 is positioned to the right of the right end 14a of the front fork 14.

As shown in FIG. 7, the horn 70 can be separated or displaced laterally from the cylinder 30b of the engine 30 in the front view. For example, the horn 70 can be disposed to the right of the cylinder 30b. Specifically, for example, the horn 70 can be disposed between a right end of the cylinder 30b and the outmost end 22a of the right side cover 22.

As described above, in the motorcycle 10 according to the embodiment under discussion, at least a part of the horn 70 can be disposed to overlap with the inner panel 42 and be separated or displaced laterally from the front forks 14 in a front view. For example, the horn 70 can be disposed to the right of the front forks 14 (e.g., outside of the forks in a lateral direction) in a front view. Therefore, the sound output from the horn 70 can be directly transmitted forward without interference from the front forks 14. As a result, it is possible to achieve an effective sound volume from the horn 70. Additionally, obstruction of airflow by the horn 70 can be reduced or eliminated.

In the motorcycle 10 according to the embodiment under discussion, the front wheel 12 can have a smaller width than a front wheel of a conventional motorcycle. If the front wheel has a large width, a distance between left and right tubes of the front forks is long. In this case, even if the horn is disposed inside the front forks in the lateral direction, there is no serious interference with the sound of the horn from the front forks. If the front wheel 12 has a smaller width, however, the distance between the left and right tubes of the front forks 14 is shorter and the front forks 14 are more likely to interfere with the sound of the horn 70. Thus, structures according to the illustrative embodiment as described above are particularly advantageous when the front wheel 12 has a smaller width as compared to conventional motorcycles.

In the motorcycle 10 according to the illustrative embodiment under discussion, the inner panel 42 (see FIG. 3) can be formed with the main opening 72 extending laterally across a center (e.g., across a central line M1) and the horn opening 60 can be at least partially laterally separated or displaced from or positioned outside the main opening 72. The horn 70 can be disposed to face substantially forward behind the horn opening 60 in the inner panel 42 (see FIGS. 4 and 5). Therefore, the rearward flow of the flowing air through the main opening 72 from the front of the vehicle can be undisturbed or unobstructed by the horn 70. In the embodiment under discussion, the radiator 40 can be disposed behind the main opening 72 and the flow of the flowing air supplied to the radiator 40 can be undisturbed or unobstructed by the horn 70. Therefore, reduction in the cooling performance of the radiator 40 can be suppressed.

Moreover, because the horn 70 can be disposed to face substantially forward, the warning sound from the horn 70 can be smoothly and effectively output in a forward direction. Furthermore, because the horn 70 can be positioned outside the main opening 72, it is possible to suppress interference by the front wheel 12 with the warning sound from the horn 70. Therefore, it is possible to deliver the warning sound at sufficient volume to the person or the like in front of the vehicle without increasing the horn 70 in size. As a result, the horn 70 can be reduced in any or all of size, weight, and cost.

According to the embodiment under discussion, the horn 70 can be disposed so as to be separated or spaced apart rearward from the horn opening 60 in the inner panel 42 (see FIG. 5). Therefore, even if mud splashed from the ground spatters around the horn opening 60, the mud is less likely to stick to the horn 70. The warning sound from the horn 70 is therefore less likely to be weakened by mud sticking to the horn 70.

Figure 6:
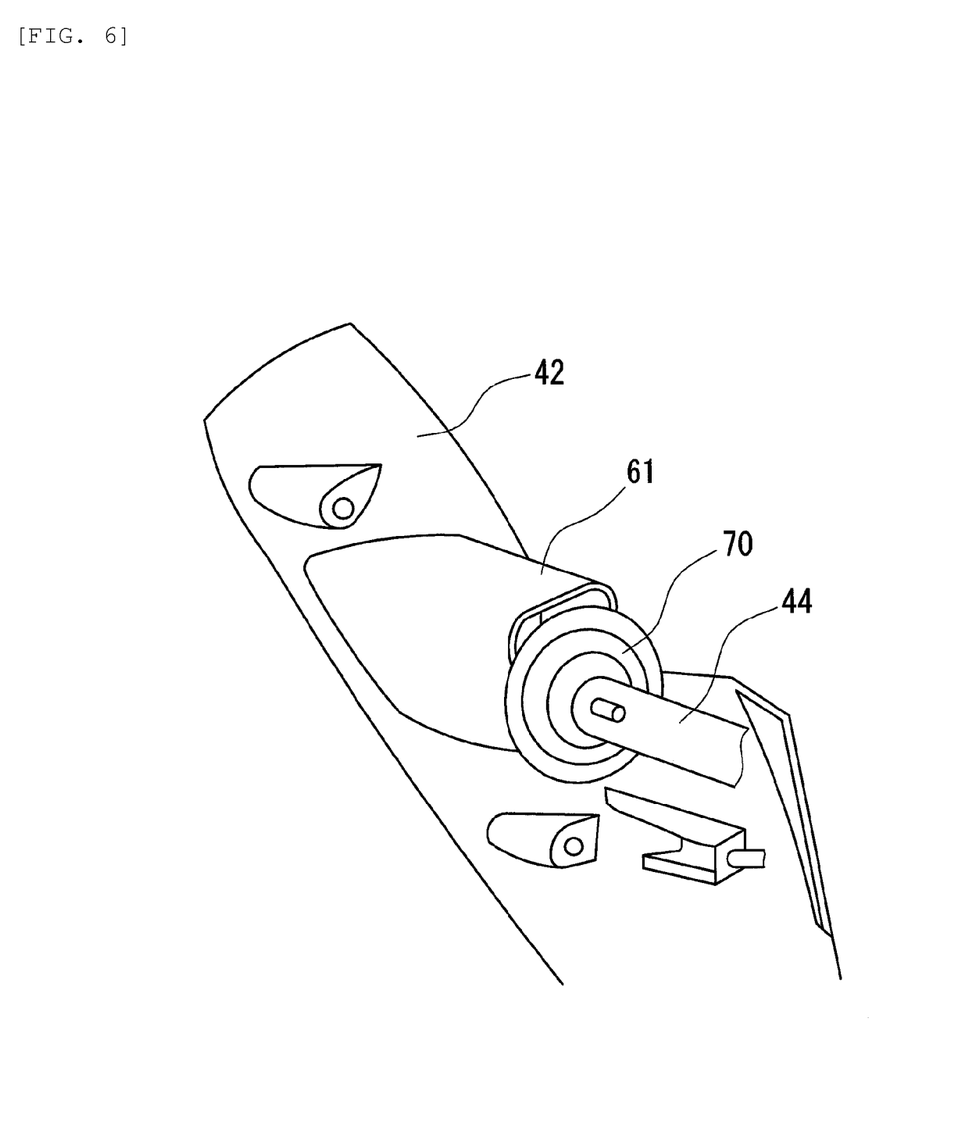
FIG. 6 is a perspective view of the horn viewed from behind.

Furthermore, according to this embodiment, the cylindrical portion 61 extending rearward can be formed around the horn opening 60 in the inner panel 42 (see FIG. 6). In this way, it is possible to further suppress sticking of mud splashed from the ground to the horn 70. Moreover, the cylindrical portion 61 can suppress diffusion of the warning sound output from the horn 70. In other words, the cylindrical portion 61 can function in a manner similar to a manner in which a megaphone functions, and thereby make it possible to effectively emit the warning sound from the horn 70 in a forward direction. Moreover, the cylindrical portion 61 can also function as a reinforcement rib to thereby enhance strength of the inner panel 42. As a result, it is possible to secure sufficiently high strength of the inner panel 42 in spite of the plurality of openings (the main opening 72, the airflow openings 50L, 50R, the airflow openings 52L, 52R, and the horn opening 60) formed in the inner panel 42.

Further, according to this embodiment, the horn opening 60 can be formed above the middle position in the vertical direction of the inner panel 42 in the front view (e.g., above a center line M2; see FIG. 3). An upper end of the horn 70 can be positioned above an upper end of the radiator 40 in a front view or side view (see FIG. 2 and FIG. 4). Because, according to such an arrangement, the horn opening 60 and the horn 70 are in comparatively high positions, mud splashed from the ground is less likely to stick to the horn 70. Moreover, because the horn opening 60 and the horn 70 are in comparatively high positions, it is possible to effectively deliver the warning sound from the horn 70 to the person or the like in front of the vehicle.

Still further, according to this embodiment, the horn opening 60 can be formed to one side of the main opening 72 (see FIG. 3). Therefore, it is possible to secure sufficient space for forming other openings (e.g., the airflow openings 50L, 50R, 52L, 52R) in the inner panel 42 below the main opening 72.

Still further, according to this embodiment, the airflow openings 50L, 50R, 52L, 52R can be formed in the inner panel 42 and below the main opening 72 and the horn opening 60 in the front view (see FIG. 2). Therefore, it is possible to introduce flowing air rearward from the front of the inner panel 42 through the airflow openings 50L, 50R, 52L, 52R. Therefore, with the inner panel 42 it is possible to effectively cool the vehicle parts with the flowing air taken in through the airflow openings 50L, 50R, 52L, 52R while preventing, to at least some extent, sticking of mud or the like to the vehicle parts such as the engine 30.

Still further, according to this embodiment, the horn opening 60 and the horn 70 can be disposed to the right of the front forks 14 in the front view (see FIG. 2). Therefore, the warning sound output from the horn 70 can be unobstructed by the front forks 14. As a result, it is possible to deliver the warning sound at sufficient volume to a person or the like in front of the vehicle without increasing the horn 70 in size. Still further, according to this embodiment, because the horn 70 need not be provided in front of the front forks 14, an interval between the front forks 14 (i.e., a fork pitch) can be shortened. In this way, it is possible to shorten a width of the front wheel 12. Moreover, it is possible to increase a steering angle of the handlebar 16, and it is possible for the motorcycle 10 to be capable of small turns.

Still further, according to this embodiment, the horn 70 can be supported on the radiator 40 with the bracket 43 and the stay 44 interposed therebetween (see FIG. 5). In other words, the horn 70 can be indirectly supported on the radiator 40. By supporting the horn 70 on the radiator 40 in this way, a member for supporting the horn 70 need not be provided to the vehicle frame 24. Moreover, it is easy to dispose the horn 70 close to the inner panel 42. Furthermore, the radiator 40 is a relatively heavy and large vehicle part and is less susceptible to vibration. Therefore, by supporting the horn 70 on the radiator 40, it is possible to support the horn 70 securely. Moreover, the warning sound from the horn 70 is less liable to be attenuated by vibration. Although the horn 70 is supported indirectly by the radiator 40 in this embodiment, the horn 70 can, alternatively, be supported directly on the radiator 40.

Still further, according to this embodiment, the horn 70 can be disposed to the right of the middle position (e.g., corresponding to line M1) in the lateral direction of the vehicle, and the exhaust pipe 33 can be disposed to the left of the middle position (see FIG. 2). By disposing the horn 70 on the opposite side to the exhaust pipe 33 in this way, it is possible to avoid interference with the sound of the horn 70 by the exhaust pipe 33, and it is possible to relatively freely select a mounted position of the horn 70 without being restricted by the position of the exhaust pipe 33.

The engine 30, according to this embodiment, can be a single-cylinder engine, although use of other types of engines is possible as discussed above. If the engine 30 is a single-cylinder engine, the engine 30 can have a shorter width than a parallel multicylinder engine, for example. A width of the radiator 40 can be comparatively short, too. Therefore, it is easy to dispose the horn opening 60 and the horn 70 to the side of the main opening 72.

Second Exemplary Embodiment

Figure 8:
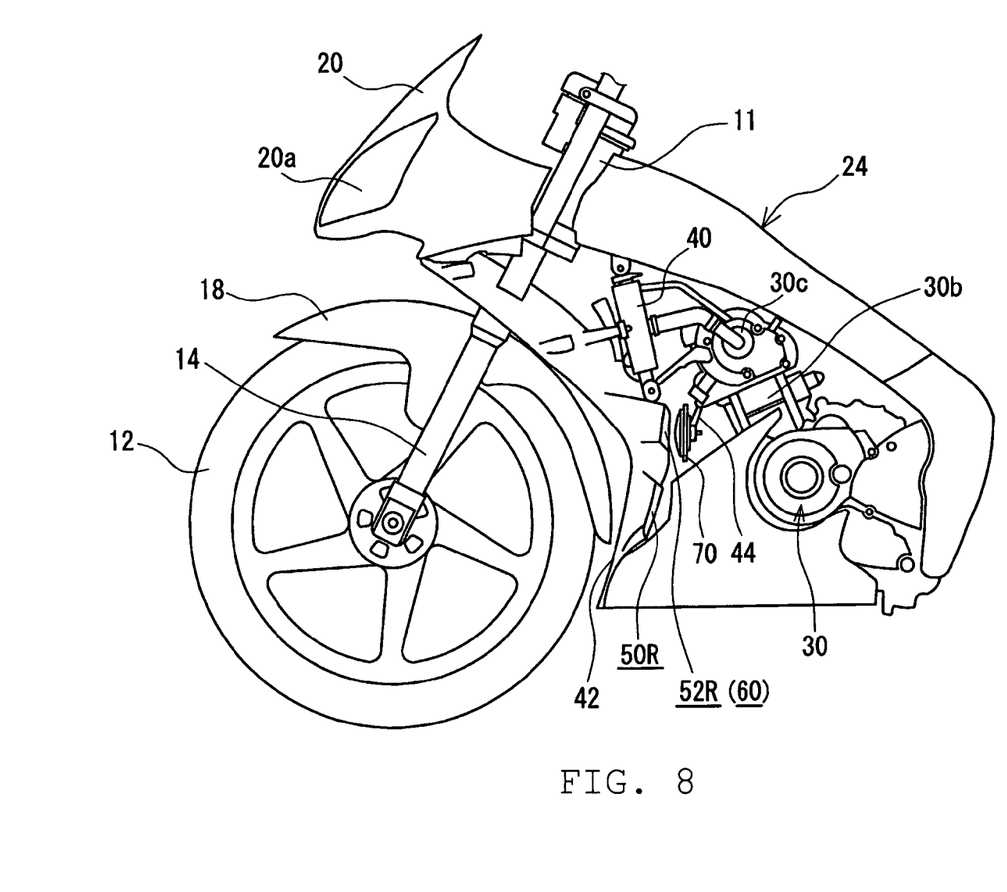
FIG. 8 is another cut-away side view showing an inside of the motorcycle according to a second exemplary embodiment.

As shown in FIG. 8, a second exemplary embodiment may be different from the first exemplary embodiment in that the horn opening 60 formed to the lateral side of the main opening 72 is omitted and that the airflow opening 52R is used as the horn opening. In other words, in the second embodiment, the airflow opening 52R described earlier in connection with the first embodiment functions in a same or similar manner to that of the horn opening 60.

In the second embodiment, a bracket (not shown) can be supported by the cylinder 30b of the engine 30, and the stay 44 for the horn 70 can be mounted to the bracket. In this embodiment, the horn 70 can be disposed to face substantially forward behind the horn opening (that is, the airflow opening 52R).

Still referring to FIG. 8, other portions of second embodiment can be the same as or similar to those described above in connection with the first embodiment. Portions similar to or the same as those in the first embodiment are provided with the same reference numerals in FIG. 8 to promote understanding. In the second embodiment, at least a part of the horn 70 can be disposed to overlap with the inner panel 42, and be laterally displaced from the front forks 14 in the front view.

Third Exemplary Embodiment

Figure 9:
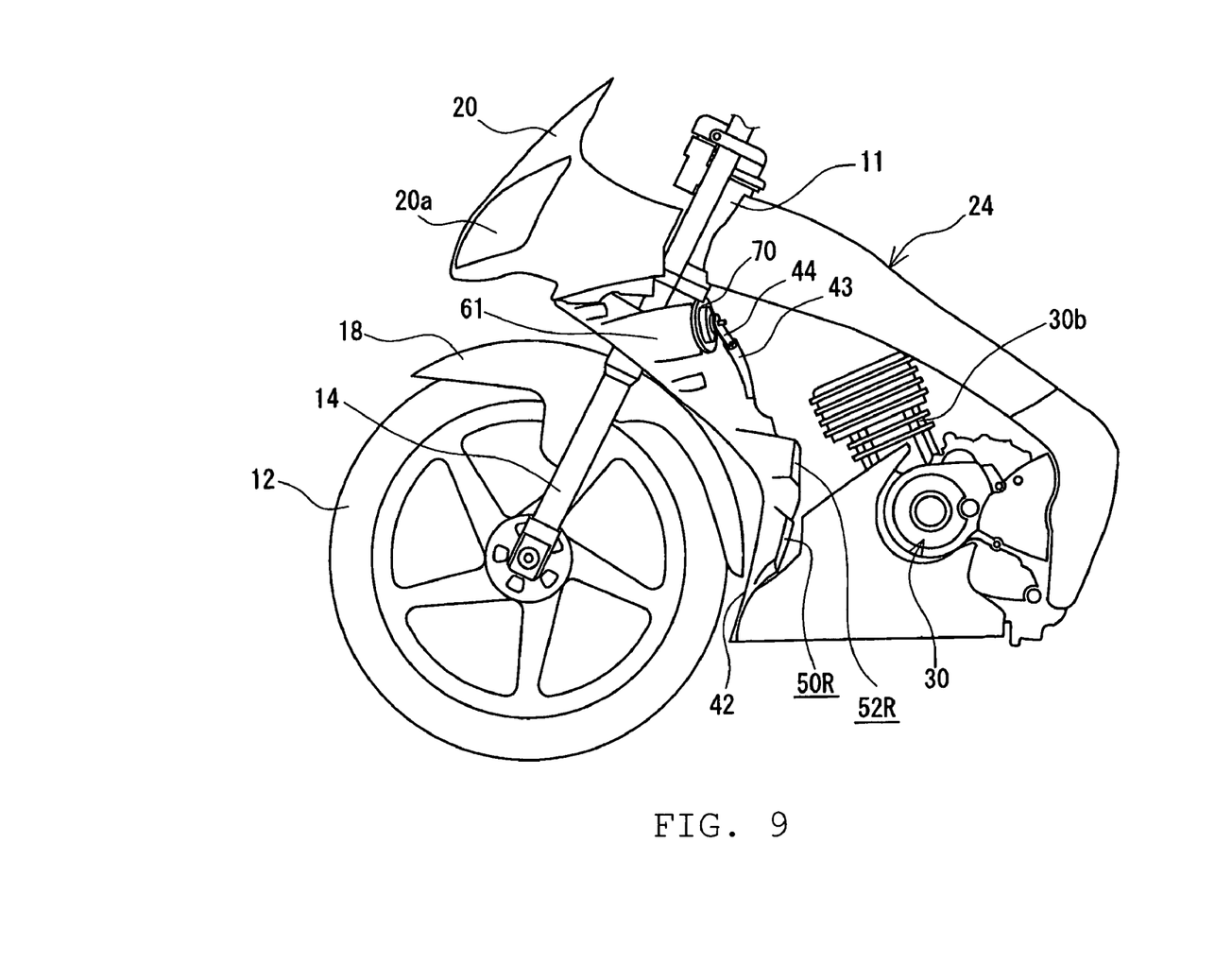
FIG. 9 is still another cut-away side view showing an inside of the motorcycle according to a third exemplary embodiment.

As shown in FIG. 9, a third exemplary embodiment can differ from the first exemplary embodiment in that the engine 30 can be an air-cooled engine and that the radiator 40 can be omitted. Portions similar to or the same as those in the first embodiment are provided with the same reference numerals in FIG. 9 to promote understanding. In the third embodiment, at least a part of the horn 70 can be disposed to overlap with the inner panel 42, and be laterally displaced from the front forks 14 in the front view.

In the third embodiment, the horn 70 can be disposed to the right of the cylinder 30b of the engine 30 in the front view (see FIG. 7). The horn 70 can be disposed to overlap with the inner panel 42, and be laterally separated or displaced from the front forks 14 in the front view.

In the third embodiment, flowing air passing through the main opening 72 in the inner panel 42 can be supplied to the cylinder 30b of the engine 30. The horn opening 60 can be formed to one side of the main opening 72, and the horn 70 can be disposed on that side of the main opening 72. The horn opening 60 and the horn 70 can be disposed to the right of the cylinder 30b of the engine 30. Therefore, the flow of the flowing air to be supplied to the cylinder 30b can be unobstructed by the horn 70. Therefore, the cooling performance of the engine 30 can be unimpaired by the horn 70.

Variation

Figure 10:
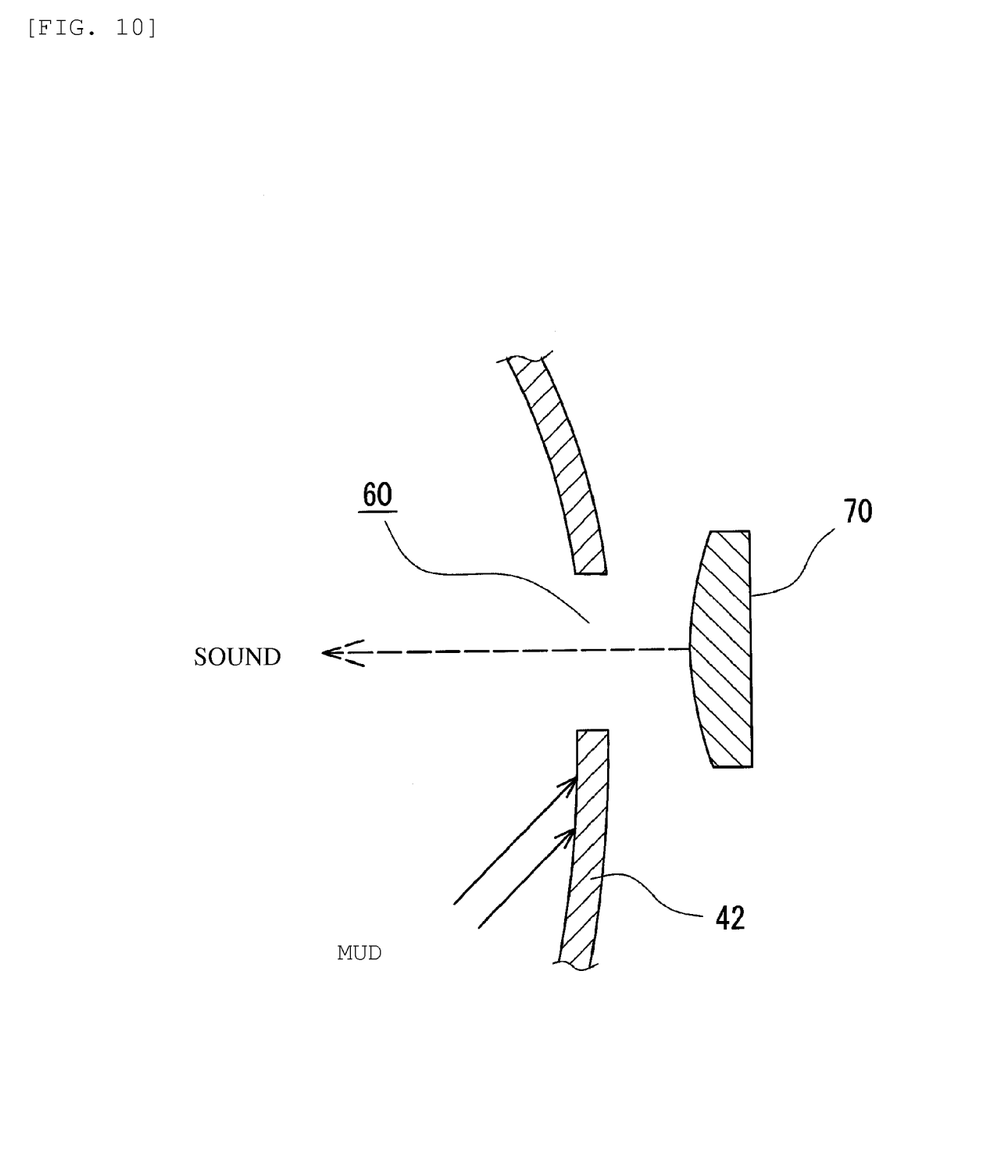
FIG. 10 is a side sectional view of the inner panel and horn.

Although the cylindrical portion 61 is illustrated as being provided behind the horn opening 60 in the inner panel 42 in the above description, the cylindrical portion 61 may be omitted as shown in FIG. 10. In this form, too, it is possible to suppress sticking of mud splashed from the ground to the horn 70, by disposing the horn 70 in a position spaced rearward from the horn opening 60. If, for example, the position of the horn opening 60 is comparatively high and therefore mud is less likely to stick to the horn 70, the horn 70 may be provided closer to the horn opening 60, for example, at, directly adjacent to, or in the horn opening 60.

Figure 11:
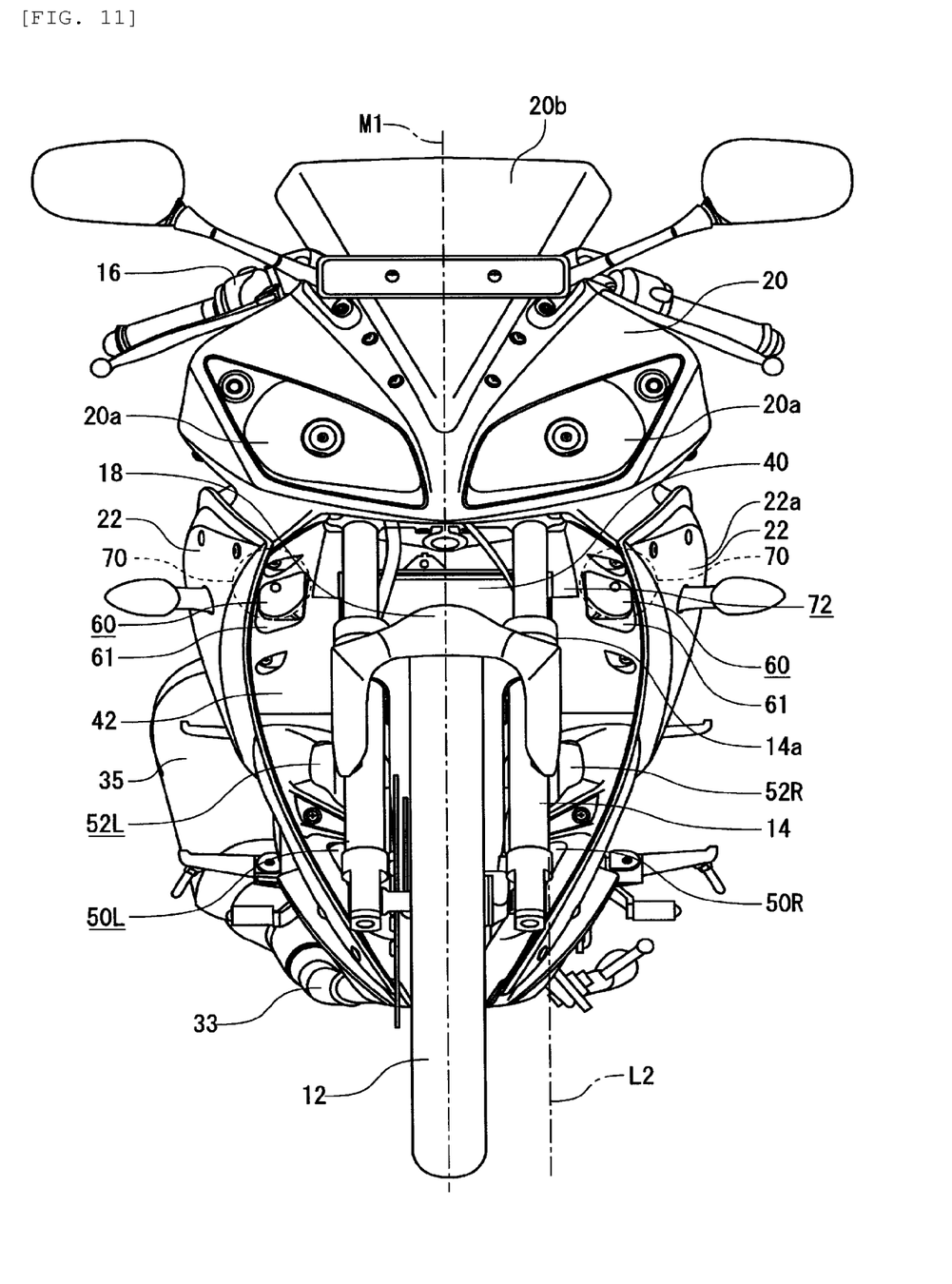
FIG. 11 is another front view of the motorcycle according to alternative embodiments of the invention.

In the above-described exemplary embodiments, the horn opening 60 and the horn 70 are illustrated as being provided on the right side in the front view. However, the horn opening 60 and the horn 70 may be provided on the left side in the front view. In this arrangement, the horn 70 can still be disposed to overlap with the inner panel 42, and be laterally separated or displaced from the front fork 14 in the leftward direction. Furthermore, in embodiments, at least one other horn and horn opening can be provided. For example, two horns 70 and two horn openings 60 can be provided. As shown in FIG. 11, a horn opening 60 and a horn 70 can be provided on both of the right side and the left side in the front view, on or at substantially the same level or vertical position. The left and right horns 70 can be positioned respectively to the right and left of the center of the inner panel 42, and can each be disposed to overlap with the inner panel 42. The left and right horns 70 can be laterally separated or displaced from the front forks 14 on respective right and left sides.

Various positional relationships between the horn opening 60 and the main opening 72 are possible, in addition to those described above. For example, the horn opening 60 and the main opening 72 can be displaced from each other in the vertical direction when viewed from the front. Furthermore, the horn opening 60 need not be completely separate from the main opening 72. Instead, the horn opening 60 can be formed as a lateral extension of the main opening 72.

The horn 70 may partially overlap the front forks 14 when viewed from the front. Moreover, the horn opening 60 and the front forks may partially overlap each other when viewed from the front.

The horn 70 may partially overlap the horn opening 60 when viewed from the front. Alternatively, the whole horn 70 may be disposed inside the horn opening 60.

Figure 12:
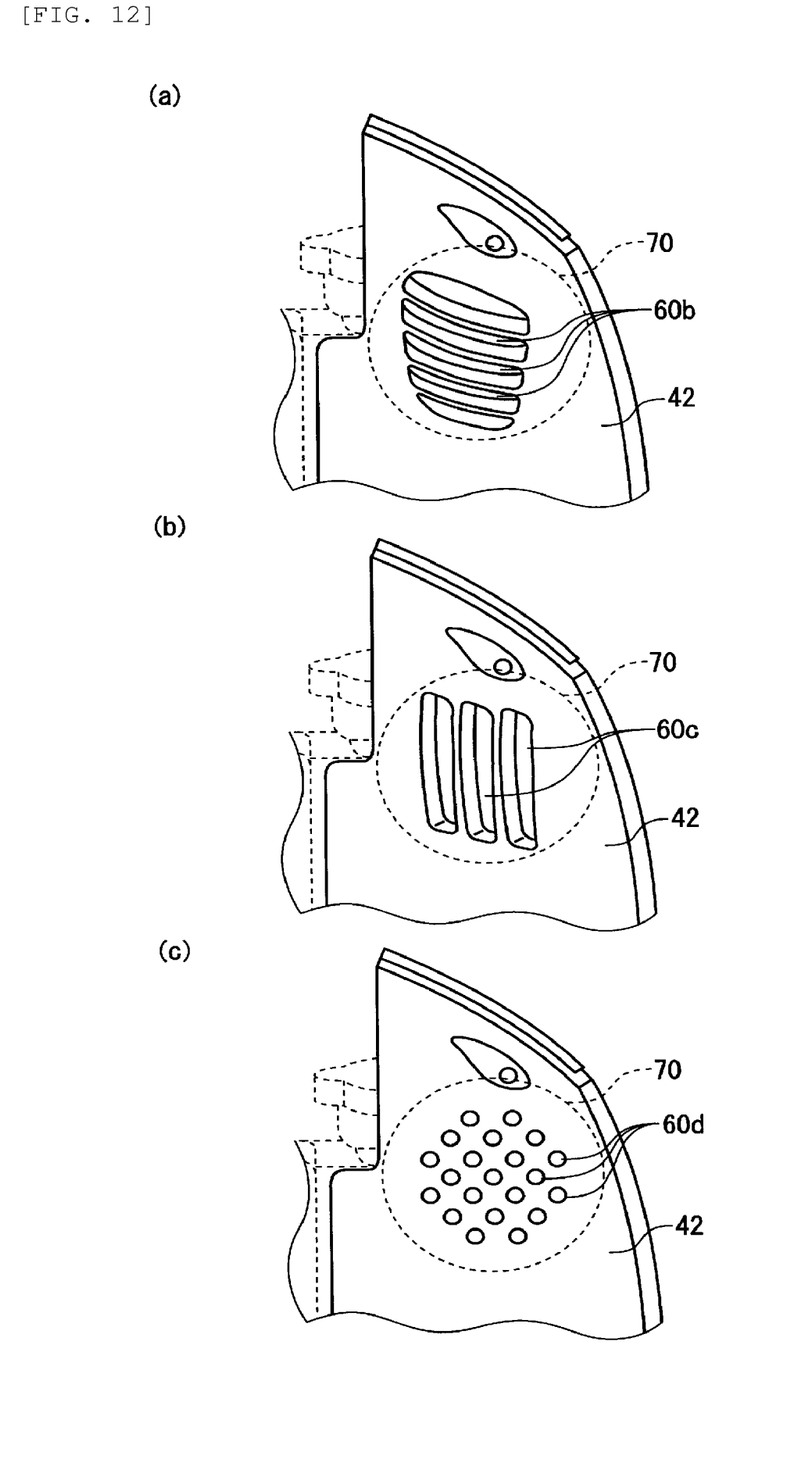
FIG. 12(a)-(c) are perspective views showing variations on an opening for the horn according to embodiments of the invention.

In the above-described exemplary embodiments, a single opening forms the horn opening 60. However, alternatives are possible. For example, a horn sound egress or channel may include a plurality of openings. FIG. 12(a) shows a horn sound egress formed of a plurality of openings 60b extending in a horizontal direction. The openings 60b can be or resemble louver openings. As shown in FIG. 12(b), the plurality of openings 60c can, additionally or alternatively, extend in a vertical direction. As shown in FIG. 12(c), the horn sound egress may be formed as a plurality of small holes 60d punched into or otherwise formed in the panel 42.

Many variations are likewise possible with the main opening 72. For example, the main opening 72 may be formed of louver openings, punched holes, or the like. The main opening 72 that lets the flowing air pass through may be replaced with a dummy opening that does not let the flowing air pass through.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims

What is claimed is:

1. A motorcycle comprising:
a head pipe;
a front fork supported by the head pipe;
a front wheel rotatably supported at a lower end portion of the front fork;
a front cowl for covering a front portion of the head pipe;
an inner panel disposed below the front cowl and behind the front wheel;
left and right side covers disposed laterally outside the inner panel and extending rearward; and
a horn, wherein at least a part of the horn is displaced laterally from the front fork in a position where the horn overlaps with the inner panel in a front view.

2. A motorcycle according to claim 1, wherein the horn is disposed behind the inner panel, and a horn opening is formed in a position of the inner panel in front of the horn.

3. A motorcycle according to claim 2, wherein the horn is disposed to face substantially forward.

4. A motorcycle according to claim 2, wherein the horn is disposed so as to be spaced rearward from the horn opening.

5. A motorcycle according to claim 2, further comprising a cylindrical portion arranged about the horn opening.

6. A motorcycle according to claim 2, wherein the horn opening is formed above a middle position of the inner panel in the front view.

7. A motorcycle according to claim 1, wherein the inner panel includes a main opening laterally displaced inward from the horn in the front view.

8. A motorcycle according to claim 7, wherein the main opening extends laterally across a center of the inner panel in the front view.

9. A motorcycle according to claim 7, further comprising a radiator disposed behind the main opening, wherein the horn is displaced laterally from the radiator in the front view.

10. A motorcycle according to claim 7, further comprising a radiator disposed behind the main opening, wherein the horn is supported by the radiator.

11. A motorcycle according to claim 7, further comprising a radiator disposed behind the main opening, wherein an upper end of the horn is positioned above an upper end of the radiator in the front view.

12. A motorcycle according to claim 7, further comprising an engine having a cylinder at least partially positioned behind the main opening, wherein the horn is displaced laterally from the cylinder in the front view.

13. A motorcycle according to claim 2, wherein a main opening is formed in the inner panel, in a position laterally displaced inward from the horn in the front view.

14. A motorcycle according to claim 13, wherein the horn opening is formed to a side of the main opening.

15. A motorcycle according to claim 13, wherein one or more airflow openings are formed in the inner panel, below the main opening and the horn opening in the front view.

16. A motorcycle according to claim 1, further comprising an exhaust pipe disposed to the right or left of a center of the motorcycle, wherein the horn is disposed on an opposite side of the exhaust pipe with respect to a lateral direction in a front view of the motorcycle.

17. A motorcycle according to claim 1, further comprising a single-cylinder engine.

18. A motorcycle according to claim 1, further comprising at least one other horn.

19. A motorcycle according to claim 18, wherein the at least one other horn is disposed in a same vertical position, in the front view, as the horn.

20. A motorcycle according to claim 18, wherein the horn and the at least one other horn are positioned to the right and left, respectively, of a center of the inner panel in the front view.

\* \* \* \* \*